(12) United States Patent
Luo et al.

(10) Patent No.: US 10,755,616 B2
(45) Date of Patent: Aug. 25, 2020

(54) GRATING AND METHOD FOR MANUFACTURING THE SAME, METHOD FOR DRIVING A GRATING, NAKED EYE THREE-DIMENSIONAL DISPLAY SYSTEM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xingyou Luo, Beijing (CN); Shijun Wang, Beijing (CN); Xi Chen, Beijing (CN); Wenjun Xiao, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/329,908

(22) PCT Filed: Jul. 10, 2018

(86) PCT No.: PCT/CN2018/095123
§ 371 (c)(1),
(2) Date: Mar. 1, 2019

(87) PCT Pub. No.: WO2019/037556
PCT Pub. Date: Feb. 28, 2019

(65) Prior Publication Data
US 2019/0187483 A1    Jun. 20, 2019

(30) Foreign Application Priority Data

Aug. 25, 2017 (CN) .......................... 2017 1 0741289

(51) Int. Cl.
*G09G 3/00* (2006.01)
*G02F 1/133* (2006.01)
(Continued)

(52) U.S. Cl.
CPC ........... *G09G 3/003* (2013.01); *G02B 5/1842* (2013.01); *G02B 30/00* (2020.01);
(Continued)

(58) Field of Classification Search
CPC .. H04N 13/302; G02B 5/1842; G02B 5/1866; G02B 30/52; G02B 30/54;
(Continued)

(56) References Cited

U.S. PATENT DOCUMENTS 9,904,065 B2    2/2018  Jin et al.
2007/0052703 A1  3/2007  Seto
(Continued)

FOREIGN PATENT DOCUMENTS

CN    103995412 A    8/2014
CN    104298019 A    1/2015
(Continued)

OTHER PUBLICATIONS

International Search Report and English Translation of Box V of the Written Opinion dated Sep. 30, 2018, received for corresponding PCT Application No. PCT/CN2018/095123.

*Primary Examiner* — Sanjiv D. Patel
(74) *Attorney, Agent, or Firm* — Kinney & Lange, P.A.

(57) ABSTRACT

The present disclosure relates to a grating and a method for manufacturing the same, a method for driving a grating, and a naked eye three-dimensional display system. The grating includes a simplest grating and a driving signal line, the simplest grating is composed of a plurality of grating units arranged in sequence, the driving signal lines are connected to the grating units, and the driving signal line is configured
(Continued)

to transmit a driving signal to each one of the plurality of grating units according to different resolutions so as to drive each grating unit to present a light penetration state or a light blocking state such that a grating constant corresponding to the resolution is obtained by the simplest grating.

15 Claims, 3 Drawing Sheets

(51) Int. Cl.
| | |
|---|---|
| G09G 3/3225 | (2016.01) |
| G09G 3/36 | (2006.01) |
| G02F 1/155 | (2006.01) |
| G02F 1/163 | (2006.01) |
| G02F 1/1343 | (2006.01) |
| G02B 30/00 | (2020.01) |
| H04N 13/302 | (2018.01) |
| G02B 5/18 | (2006.01) |
| G02F 1/15 | (2019.01) |
| G02F 1/135 | (2006.01) |

(52) U.S. Cl.
CPC .... *G02F 1/13306* (2013.01); *G02F 1/134309* (2013.01); *G02F 1/15* (2013.01); *G02F 1/155* (2013.01); *G02F 1/163* (2013.01); *G09G 3/3225* (2013.01); *G09G 3/3648* (2013.01); *H04N 13/302* (2018.05); *G02F 2001/1351* (2013.01); *G09G 2310/0264* (2013.01)

(58) Field of Classification Search
CPC .............. G02B 26/0808; G02B 5/1871; G02B 5/0252; G02F 2201/30; G09G 3/003; G09G 2340/14; G09G 3/3225
See application file for complete search history.

(56) References Cited

U.S. PATENT DOCUMENTS

| | | | |
|---|---|---|---|
| 2014/0375778 A1* | 12/2014 | Miao | H04N 13/31 348/51 |
| 2016/0377876 A1* | 12/2016 | Li | G02B 30/27 359/275 |
| 2017/0192243 A1* | 7/2017 | Jin | G02F 1/133526 |
| 2017/0214906 A1* | 7/2017 | Yang | H04N 13/312 |
| 2019/0187483 A1 | 6/2019 | Luo et al. | |

FOREIGN PATENT DOCUMENTS

| | | |
|---|---|---|
| CN | 105629620 A | 6/2016 |
| CN | 107436500 A | 12/2017 |
| EP | 3203312 A1 | 1/2015 |

\* cited by examiner

GRATING AND METHOD FOR MANUFACTURING THE SAME, METHOD FOR DRIVING A GRATING, NAKED EYE THREE-DIMENSIONAL DISPLAY SYSTEM

CROSS-REFERENCE TO RELATED APPLICATION

The present application claims the benefit of Chinese Patent Application No. 201710741289.6 filed on Aug. 25, 2017 in the State Intellectual Property Office of China, the whole disclosure of which is incorporated herein by reference.

TECHNICAL FIELD

Embodiments of the present disclosure relate to a field of display technologies, and in particular, to a grating and a method for manufacturing the same, a method for driving a grating, and a naked eye three-dimensional display system.

BACKGROUND

In the current three-dimensional display technology, in addition to requiring user to wear a pair of three-dimensional glasses to obtain a three-dimensional display effect, it is possible to obtain a naked eye three-dimensional display effect by adding a structure such as a grating for a naked eye three-dimensional display, in the display screen.

SUMMARY

According to an aspect of the present disclosure, there is provided a grating comprising a simplest grating and driving signal lines, the simplest grating is composed of a plurality of grating units arranged in sequence, the driving signal lines are connected to the grating units, and the driving signal line is configured to transmit a driving signal to each one of the plurality of grating units according to different resolutions so as to drive each grating unit to present a light penetration state or a light blocking state such that a grating constant corresponding to the resolution is obtained by the simplest grating.

In an embodiment of the present disclosure, according to different resolutions, the simplest grating is driven to form light transmitting units and light blocking units which are alternately arranged, width of the light transmitting units and the light blocking units vary depending on the driving signal, wherein the light transmitting units are respectively formed by combining grating units in the light penetration state, and the light blocking units are respectively formed by combining grating units in the light blocking state.

In an embodiment of the present disclosure, each of the grating unit has a plurality of grating unit coefficients $b_j$, the number of the grating unit coefficients being equal to the number of the resolutions; the number Z of grating units in the simplest grating satisfies $Z=2m$, where m is the least common multiple of the plurality of grating unit coefficients $b_j$, the grating unit coefficients $b_j$ being:

$$b_j = M_j/A1 = N_j/A2,$$

where $M_j \times N_j$ is the jth resolution of the plurality of resolutions, j, $M_j$, $N_j$ are natural numbers and $j \leq n$, where n is the total number of the plurality of resolutions, and $M_j$ and $N_j$ represent the total number of rows of pixels in the jth resolution and the total number of columns of pixels in the jth resolution, and $M_j/N_j$ is a fixed value, A1 is the greatest common divisor of the total number of rows of the plurality of resolutions, and A2 is the greatest common divisor of the total number of columns of the plurality of resolutions.

In an embodiment of the present disclosure, a ratio of a width Wd of the grating unit to a pitch p of periodically arranged grating units is $(1:0.6) \sim (1:1.5)$, the pitch p satisfies $p = \alpha \cdot P \cdot r/m$, where $\alpha$ is an adjustment coefficient of a visual range, r is a maximum value of the plurality of grating unit coefficients $b_j$, a pixel pitch P satisfies: $P = \sqrt{d^2/(M_1^2 + N_1^2)}$, where d is the size of a display screen of the naked eye three-dimensional display system, and $M_1 \times N_1$ is the highest resolution among the plurality of resolutions.

In an embodiment of the present disclosure, the number of the driving signal lines is N, and $N = 2^n$, where n is the total number of the plurality of resolutions.

In an embodiment of the present disclosure, each of the grating units of the simplest grating is assigned a code, the number of bits of the code being the number of the resolutions and those grating units with the same code being connected to a same driving signal line;

wherein, for each resolution, the grating unit is encoded as one of 0 and 1 corresponding to the resolution in a condition that the grating unit is driven to present a light penetration state; the grating unit is encoded as the other one of 0 and 1 in a condition that the grating unit is driven to present a light-blocking state.

In an embodiment of the present disclosure, among the plurality of the grating units, those grating units having a same display state at any resolutions are connected to the same driving signal line.

In an embodiment of the present disclosure, the grating is a liquid crystal grating or an electrochromic grating.

According to another aspect of the present disclosure, there is provided a method for driving a grating, wherein the grating comprises a simplest grating and driving signal lines, the simplest grating is composed of a plurality of grating units arranged in sequence, the driving signal lines being connected to the grating units and each of the driving signal line is configured to transmit a driving signal to a respective one of the plurality of grating units according to different resolutions so as to drive each grating unit to present a light penetration state or a light blocking state, the method comprising:

(1) determining a display state of the grating unit according to a resolution of the display;

(2) transmitting a driving signal for driving the grating unit to the driving signal line according to the display state.

In an embodiment of the present disclosure, according to different resolutions, the simplest grating is driven to form light transmitting units and light blocking units which are alternately arranged, widths of the light transmitting units and the light blocking units vary depending on the driving signal, wherein the light transmitting units are respectively formed by combining grating units in the light penetration state, and the light blocking units are respectively formed by combining grating units in the light blocking state, wherein the step of determining a display state of the grating unit according to a resolution of the display comprises:

(1) determining widths of the light transmitting units and the light blocking units according to a resolution of the display;

(2) determining the display state of the grating unit according to the widths of the grating units.

In an embodiment of the present disclosure, the widths of the light transmitting units and the light blocking units are determined according to a grating constant D of the simplest grating, and the grating constant D are different depending on the resolutions, the widths of the light transmitting unit and the light blocking unit are equal and D/2.

In an embodiment of the present disclosure, the grating constant D satisfies $D=2p \cdot m/b_j$, where $b_j$ is a grating unit coefficient, and the grating unit coefficient $b_j$ is: $b_j=M_j/A1=N_j/A2$, where $M_j \times N_j$ is the jth resolution of the plurality of resolutions, j, $M_j$, $N_j$ are natural numbers and $j \leq n$, where n is the total number of the plurality of resolutions, and $M_j$ and $N_j$ represent the total number of rows of pixels in the jth resolution and the total number of columns of pixels in the jth resolution, and $M_j/N_j$ is a fixed value, A1 is the greatest common divisor of the total number of rows of the plurality of resolutions, and A2 is the greatest common divisor of the total number of columns of the plurality of resolutions, m is the least common multiple of the plurality of grating unit coefficients, p is a pitch of periodically arranged grating units which satisfies $p=\alpha \cdot P \cdot r/m$, wherein $\alpha$ is an adjustment coefficient of a visual range, r is a maximum value of the plurality of grating unit coefficients $b_j$, P is a pixel pitch and satisfies: $P=\sqrt{d^2/(M_1^2+N_1^2)}$, where d is the size of a display screen of the naked eye three-dimensional display system, and $M_1 \times N_1$ is the highest resolution among the plurality of resolutions.

According to another aspect of the present disclosure, there is provided a naked eye three-dimensional display system comprising:

a display screen; and the grating mentioned above.

In an embodiment of the present disclosure, the display screen comprises a liquid crystal display screen, the grating being disposed in front of the liquid crystal display screen or behind the liquid crystal display screen, or the display screen comprises an OLED display screen, the grating being arranged in front of the OLED display screen.

According to another aspect of the present disclosure, there is provided a method for manufacturing a grating, wherein the grating comprises a simplest grating and a driving signal line, the simplest grating is composed of a plurality of grating units arranged in sequence, the driving signal lines being connected to the grating units and each of the driving signal line is configured to transmit a driving signal to a respective one of the plurality of grating units according to different resolutions so as to drive each grating unit to present a light penetration state or a light blocking state, the method comprising:

(1) determining the number of the grating units and the width of the grating units according to the resolution of the display;

(2) determining the number of the driving signal lines, and connecting the driving signal lines to the corresponding grating units so that the grating units may be driven to form light transmitting units and light blocking units which are alternately arranged.

In an embodiment of the present disclosure, according to different resolutions, the simplest grating is driven to form light transmitting units and light blocking units which are alternately arranged, widths of the light transmitting units and the light blocking units vary depending on the driving signal, wherein the light transmitting units are respectively formed by combining grating units in the light penetration state, and the light blocking units are respectively formed by combining grating units in the light blocking state.

In an embodiment of the present disclosure, the number of the grating units is determined by the following steps, determining the grating unit coefficient $b_j$ corresponding to each of the plurality of the resolutions:

$$b_j=M_j/A1=N_j/A2,$$

where $M_j \times N_j$ is the jth resolution of the plurality of resolutions, j, $M_j$, $N_j$ are natural numbers and $j \leq n$, where n is the total number of the plurality of resolutions, and $M_j$ and $N_j$ represent the total number of rows of pixels in the jth resolution and the total number of columns of pixels in the jth resolution, and $M_j/N_j$ is a fixed value, A1 is the greatest common divisor of the total number of rows of the plurality of resolutions, and A2 is the greatest common divisor of the total number of columns of the plurality of resolutions, the number Z of grating units satisfies $Z=2m$, where m is the least common multiple of the plurality of grating unit coefficients;

the width of the grating units is determined by the following steps: a ratio of a width Wd of the grating unit to a pitch p of periodically arranged grating units is (1:0.6)~(1:1.5), the pitch p satisfies $p=\alpha \cdot P \cdot r/m$, where $\alpha$ is an adjustment coefficient of a visual range, r is a maximum value of the plurality of grating unit coefficients $b_j$, P is a pixel pitch and satisfies: $P=\sqrt{d^2/(M_1^2+N_1^2)}$, where d is the size of a display screen of the naked eye three-dimensional display system, and $M_1 \times N_1$ is the highest resolution among the plurality of resolutions.

In an embodiment of the present disclosure, the number of the driving signal lines is $N=2^n$, and n is the total number of the plurality of resolutions.

BRIEF DESCRIPTION OF THE DRAWINGS

The above and/or additional aspects and advantages of the present disclosure will become apparent and readily understood from the description of the embodiments, in which.

DETAILED DESCRIPTION OF EMBODIMENTS

Figure 1:
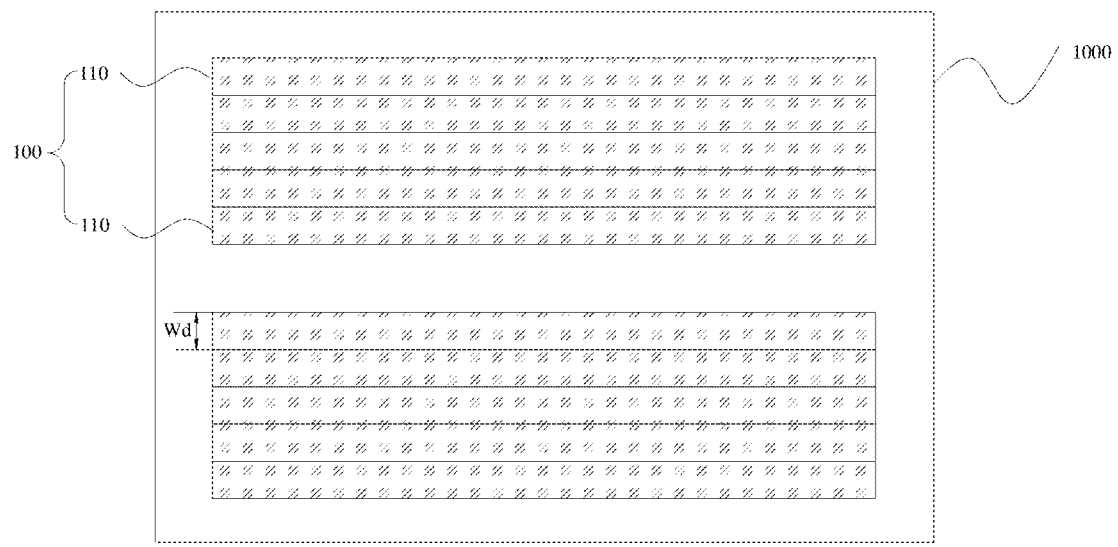
FIG. 1 shows a schematic structural view of a grating according to an embodiment of the present disclosure.

The embodiments of the present disclosure are described below by way of specific examples, and the following examples are intended to illustrate the disclosure and are not intended to limit the protective scope of the disclosure. Where specific techniques or conditions are not described in the embodiments, they are performed according to the techniques or conditions described in the documents in the related art or product specifications.

In addition, in the embodiments shown in the drawings, the same or similar reference numerals are used to refer to the same or similar elements or elements having the same or similar functions.

In the description of the present disclosure, the orientations or positional relationships indicated by the terms "upper", "lower" and the like are based on the relative orientations or relative positional relationships shown in the drawings, and is merely for the convenience of describing the present disclosure and does not require that the solution of the present disclosure should be configured or performed in a specific orientation. Therefore, they should not to be understood as a limitation to the present disclosure.

In one aspect of the disclosure, the present disclosure proposes a grating. According to an embodiment of the present disclosure, referring to FIGS. 1 and 5, a grating 1000 includes simplest gratings 100 and driving signal lines S0-S7, and each simplest grating 100 is composed of a plurality of grating units 110 arranged in sequence, and the driving signal lines are configured to transmit driving signals to respective grating units 110 according to different display resolutions, respectively. Each of the grating units 110 may be driven to present a light penetration state and a light blocking state by the driving signal lines, so that a respective simplest grating 100 is driven to form light transmitting units and light blocking units which are alternately arranged. The width of each of the light transmitting unit and the light blocking unit varies depending on the respective driving signal, so that grating parameters of the simplest grating correspond to the display resolutions. According to an embodiment of the present disclosure, a plurality of adjacent grating units that are all in a light penetration state or are all in a light blocking state are combined to form a light transmitting unit or a light blocking unit of the simplest grating. According to an embodiment of the present disclosure, the grating 1000 is used for a naked eye three dimensional display system which comprises a display screen and is compatible with various resolutions ranking from high to low. The grating is compatible with a wide range of resolutions and may thus facilitate a switch among multiple resolutions in the displays with same size. Thereby, a production cost of the naked eye three dimensional display system may be greatly reduced.

By further refining the structure of the grating, specifically, providing that the grating is divided into a plurality of grating units having a relatively small width and the width of each of the grating unit structures is smaller than the slit width of the grating as required by a highest resolution (corresponding to a smallest grating constant) among the plurality of compatible resolutions with which the grating may be compatible. For example, a grating with a certain width is divided into a plurality of strip structures, and the light transmitting state of each strip structure may be changed by control. Thus, by controlling the light transmitting state of a plurality of adjacent strip structures, it is possible to achieve that the strip structures in a certain width region may be in a transparent state or in an opaque state. The plurality of strip structures in a transparent state or an opaque state will determine the grating constant and the slit width of the grating as a whole. A single strip structure is defined as a grating unit 110, so that the grating according to an embodiment of the present disclosure is composed of a plurality of simplest gratings 100, each of which simplest gratings 100 is in turn composed of the above-described grating units 110. Therefore, for display screens each having a same size and multiple resolutions, the total number and the widths of the required grating units may be calculated depending on the multiple resolutions, and the grating units are connected with the driving signal lines, respectively. According to an embodiment of the present disclosure, each one of the grating units is controlled to be in a light penetration state or in a light blocking state by applying a voltage on the respective driving signal line, thereby achieving switching among various resolutions such that the grating is capable of being compatible with a plurality of resolutions.

The various structures of the grating are described in detail below in combination with specific embodiments of the present disclosure:

According to an embodiment of the present disclosure, the grating 1000 may be applied to a plurality of naked eye three dimensional display systems which have same size and different resolutions. Therefore, a same grating may be used to ensure that different display systems of same size may display at required resolutions, respectively, thereby reducing the development cost.

The type of the grating is not particularly limited, as long as it may present a light penetration state or a light blocking state when a voltage is applied thereto. Those skilled in the art may design them according to actual conditions. For example, in accordance with an embodiment of the present disclosure, the grating 1000 may comprise a liquid crystal grating or an electrochromic grating. According to a specific embodiment of the present disclosure, the grating 1000 is a liquid crystal grating. When a voltage is applied to the grating 1000, the liquid crystal molecules are driven to deflect by the voltage, so as to control whether the light is to be transmitted or blocked, such that the grating may be in a light penetration state or in a light blocking state. According to some other embodiments of the present disclosure, the grating 1000 is an electrochromic grating, that is, the grating unit 110 is made of an electrochromic material. When a voltage is applied to the grating 1000, the grating 1000 will change in color thereof due to the influence of the voltage. The light is blocked when the color is dark, and the light transmittance is increased when the color is getting light, thereby allowing the light to pass through. The grating will be in a light penetration state or a light blocking state correspondingly.

It should be noted that the position of the grating in the display system is not particularly limited as long as a control to the light may be realized. Those skilled in the art may design them according to the specific situation. According to an embodiment of the present disclosure, the grating 1000 may be disposed behind the display screen (on a side of the display screen away from the user) and be used as a rear grating, or the grating 1000 may be disposed in front of the display screen (on a side of the display screen facing the user) and be used as a front grating.

According to an embodiment of the present disclosure, the simplest grating 100 has a plurality of grating units 110 arranged in sequence, and each of the grating units 110 has a certain width. That is to say, the simplest grating 100 and then the grating 1000 may be determined by determining the total number of the grating units 110 and the width of each grating unit 110. When the total number Z and the width (Wd as shown in FIG. 1) of the grating units 110 satisfy the following conditions, the grating may be applied to a plurality of display systems with different resolutions.

The grating unit has a plurality of grating unit coefficients, the number of the grating unit coefficients is equal to the number of resolutions, and the total number Z of the grating units satisfies Z=2m, where m is the least common multiple of the plurality of grating unit coefficients; the ratio of the width Wd of the grating unit to the pitch p of the periodic arrangement of the grating is (1:0.6)~(1:1.5).

For ease of understanding, a simple explanation of both the determination process of the total number Z and the width Wd of the grating unit 110, and the principle that it may satisfy various resolutions, is set forth hereinafter:

First, assuming that the grating 1000 may be compatible with n resolutions, which are represented by $M_1 \times N_1$, $M_2 \times N_2$, ... $M_{n-1} \times N_{n-1}$, $M_n \times N_n$, where M is the total number of rows of pixels, and N is the total number of columns of pixels. Among them, the n resolutions satisfy the following relationship:

$$\frac{M_1}{N_1} = \frac{M_2}{N_2} = \ldots = \frac{M_{n-1}}{N_{n-1}} = \frac{M_n}{N_n} \qquad (1)$$

That is to say, the ratio of the total number of rows of the various resolutions of the grating 1000 to the total number of columns of the various resolutions of the grating 1000 is a fixed value, and the various resolutions satisfying the above relationship may achieve switching thereamong. As mentioned above, the multiple resolutions are ranked from high to low. Therefore, it is defined that the highest definition resolution is $M_1 \times N_1$.

According to an embodiment of the present disclosure, the grating unit 110 has a plurality of grating unit coefficients, and the number of the grating unit coefficients is equal to the number of resolutions. Thus, the grating unit coefficient $b_j$ of the grating unit 110 and the total number Z of the grating unit 110 corresponding to the jth resolution may be calculated according to the following formula:

$$b_j = \frac{M_j}{A1} = \frac{N_j}{A2} \qquad (2)$$

$$Z = 2m \qquad (3)$$

where $M_j \times N_j$ is the jth resolution of the plurality of resolutions, j, $M_j$, $N_j$ are natural numbers and j≤n, where n is the total number of the plurality of resolutions, and $M_j$ and $N_j$ represent the total number of rows of pixels in the jth resolution and the total number of columns of pixels in the jth resolution, respectively, and $M_j/N_j$ is a fixed value, A1 is the greatest common divisor of the total number of rows of pixels of the plurality of resolutions, and A2 is the greatest common divisor of the total number of columns of pixels of the plurality of resolutions, m is the least common multiple of the plurality of grating unit coefficients.

Thus, according to an embodiment of the present disclosure, after the number n of resolutions and various resolutions are determined, the greatest common divisor A1 of the total number of rows of pixels of various resolutions, and the greatest common divisor A2 of the total number of columns of pixels of various resolutions may be above all calculated. The grating unit coefficient $b_j$ of the grating unit 110 corresponding to each resolution is then calculated according to the formula (2). Then, the least common multiple m of the grating unit coefficients $b_j$ of the grating unit 110 corresponding to each resolution is calculated, and finally the total number Z of the grating units 110 required for the n resolutions is calculated through the formula (3). Thus, the total number of grating units required for n resolutions may be obtained through the above simple algorithm.

The width Wd of the grating unit 110 and the pitch p of the periodic arrangement of the grating satisfy a ratio relationship (1:0.6)~(1:1.5). Thereby, the width of the grating unit may be obtained by the pitch of the periodic arrangement of the grating. Specifically, the pixel pitch P may be calculated above all according to the following formula:

$$P = \sqrt{\frac{d^2}{M_1^2 + N_1^2}} \qquad (4)$$

where d is the size of the display screen and $M_1 \times N_1$ is the highest resolution among the various resolutions. As described above, the resolutions are ranked from high to low, thereby the highest resolution among the plurality of resolutions is $M_1 \times N_1$.

It may be known from the formula (4) that the pixel pitch P is a fixed value after the size of the display screen and the highest resolution with which the display screen may be compatible are determined. Subsequently, the pitch p of the grating unit 110 which are periodically arranged is calculated according to the following formula:

$$p = \alpha \cdot P \cdot \frac{r}{m} \qquad (5)$$

where α is an adjustment coefficient of a visual range, r is a maximum value of the plurality of grating unit coefficients, and m is the least common multiple of the plurality of grating unit coefficients.

Figure 2:
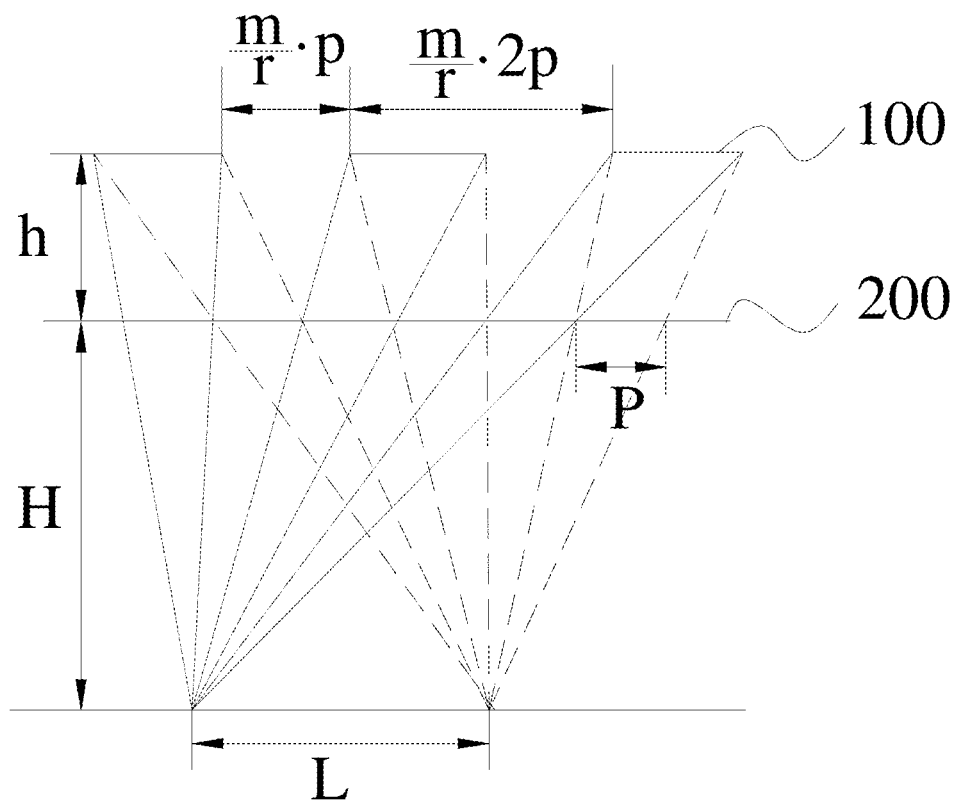
FIG. 2 shows a schematic view of a display principle of a grating according to an embodiment of the present disclosure.

Thus, according to an embodiment of the present disclosure, after the size d of the display screen and the highest resolution with which the display screen may be compatible are determined, the pixel pitch P may be firstly calculated using the size d and the highest resolution $M_1 \times N_1$ of the display screen according to formula (4). Since the size d and the highest resolution $M_1 \times N_1$ of the display screen are fixed values, the pixel pitch P is also a fixed value. Then, the pitch p of the periodic arrangement of the grating 110 is calculated using the formula (5). After the resolution is determined, the maximum value r and the least common multiple m of the grating unit coefficients of the grating unit 110 at each resolution are also determined to be fixed values. The adjustment coefficient of the visual range α is required to be determined according to a placement height of the grating 1000 as well as a distance between the observer's viewpoint and the display screen. As described above, according to an embodiment of the present disclosure, the grating 1000 may be a rear grating or may also be a front grating. According to a specific embodiment of the present disclosure, when the grating 1000 is a rear grating, referring to FIG. 2, the placement height of the grating 1000 is h, the distance between the observer viewpoint and the display screen 200 is H, and the distance between the two viewpoints is L, the following formula is obtained according to the similar triangle principle:

$$= \alpha = \frac{H + h}{H} \qquad (6)$$

According to some other embodiments of the present disclosure, when the grating 1000 is a front grating, the adjustment coefficient of a visual range α may be calculated according to the following formula:

$$\alpha = \frac{H}{H+h} \qquad (7)$$

it may be known from formula (6) and formula (7) that the placement height h of the grating 1000 (which is related to the design of the display system) and the distance H between the observer viewpoint and the display screen 200 (which may be determined empirically) are fixed values, so that the adjustment coefficient of the visual range α is also a fixed value. Thus, according to the formula (5), after the size d of the display screen and the resolution with which the display screen is compactible are determined, the pitch p of the periodic arrangement of the grating is also a fixed value. As described above, the ratio of the width Wd of the grating unit to the pitch p of the periodic arrangement of the grating is (1:0.6)~(1:1.5). Thus, those skilled in the art may design the specific width of the grating unit 110 according to the specific situation.

For example, according to an embodiment of the present disclosure, the ratio of the width Wd of the grating unit 110 to the pitch p of the grating unit 110 may be (1:0.9)~(1:1.1), and may also be (1:0.8)~(1:1.2). According to a specific embodiment of the present disclosure, the ratio of the width Wd of the grating unit 110 to the pitch p may be 1:1, that is, the width Wd of the grating unit 110 is equal to the pitch p. According to an embodiment of the present disclosure, the width of a combined grating unit whose all the grating units 110 are in the light blocking state is equal to the width of another combined grating units whose all the grating units 110 are in the light penetration state. Thus, the width of the grating unit compatible with various resolutions may be obtained through the above simple algorithm. Those skilled in the art may understand that the arrangement of the above grating units should satisfy the requirement that p is a constant value. Therefore, when Wd is larger than p, there will be some overlaps between the grating units. When Wd is smaller than p, there will be some gaps between the grating units.

Therefore, when the total number Z and the width Wd of the grating units 110 satisfy the above relationship, the widths of the light transmitting unit and the light blocking unit may satisfy requirements of the preset multiple resolutions. That is to say, the grating 1000 may be applied to a plurality of display systems having different resolutions.

According to an embodiment of the present disclosure, the grating 1000 may further include a plurality of driving signal lines. The driving signal lines are connected to the grating units 110, and each of the grating units 110 is connected to the respective driving signal line. The number of driving signal lines is $N=2^n$, n is the total number of the plurality of resolutions. A voltage is transmitted to the grating unit through the driving signal line, so that the grating unit may be driven to be in a light penetration state or a light blocking state. The corresponding relationship between the driving signal line and the grating unit is not particularly limited, as long as a driving of the grating unit through the driving signal line may be realized. Those skilled in the art may design them according to specific conditions. For example, the driving signal lines may be in one-to-one correspondence with the grating units 110, or one driving signal line may correspond to a plurality of grating units 110.

According to an embodiment of the present disclosure, an arrangement manner in which one driving signal line corresponds to a plurality of grating units 110 is employed. Specifically, the display state of the grating unit at any one of the resolutions includes a light penetration state and a light blocking state. At any one of the resolutions, the grating units 110 in the same display state are connected to the same driving signal line. Therefore, it is possible to use one and the same driving signal line to control a plurality of grating units in the same display state, thereby reducing the number of driving signal lines.

According to an embodiment of the present disclosure, each of the grating units in the simplest grating is assigned a code. The number of bits of the code is the number of the resolutions and those grating units with the same code are connected to the same driving signal line. According to an embodiment of the present disclosure, for each resolution, the grating unit is encoded as 0 corresponding to the resolution when the grating unit is driven to present a light penetration state; the grating unit is encoded as 1 corresponding to the resolution when the grating unit is driven to present a light-blocking state. For example, according to a specific embodiment of the present disclosure, when the number of resolutions is n, each grating unit in the simplest grating corresponds to a set of codes consisting of n numbers (in other words, n bits), in which the n numbers include 0(s) and/or 1(s), and those grating units with same code are finally presented in the same display state. Therefore, those grating units with same code are connected to the same driving signal line. Therefore, it is possible to use one and the same driving signal line to control a plurality of grating units in the same display state, thereby reducing the number of driving signal lines.

In another aspect of the disclosure, the present disclosure provides a method for manufacturing the grating. According to an embodiment of the present disclosure, the grating manufactured by such a method may be the grating described above, without repeating any more. Therefore, the grating manufactured by the method may have the same features and advantages as the grating described above, and details are not described herein again. According to an embodiment of the present disclosure, the grating manufactured with the method may be applied to a plurality of naked eye three dimensional display systems which have the same size and have different resolutions. According to an embodiment of the present disclosure, the method includes:

(1) determining the number of the grating units and the width of the grating units according to the resolution of the display According to an embodiment of the present disclosure, in this step, the number of grating units and the width of the grating unit are determined. The method for determining the number and widths of the grating units has been described in detail above and will not be described repeatedly herein.

(2) determining the number of the driving signal lines, and connecting the driving signal lines to the corresponding grating units According to an embodiment of the present disclosure, in this step, the number of driving signal lines and the manner in which the driving signal lines are connected to the simplest grating are determined. The manner in which the driving signal lines are connected to the simplest grating has been described in detail above and will not be described repeatedly herein. For example, according to an embodiment of the present disclosure, a manner in which one driving signal line corresponds to a plurality of grating units is employed. Specifically, the display state of the grating unit at a resolution includes a light penetration state and a light blocking state, and the grating units having the same display state at any one of the resolutions are connected to the same driving signal line. Thereby, a plurality of grating units having the same display state may be controlled by one and the same driving signal line, and the number of driving signal lines may be simplified. According to an embodiment of the present disclosure, the total number N of required driving signal lines is $2^n$, and n is the total number of the plurality of resolutions.

Figure 4:
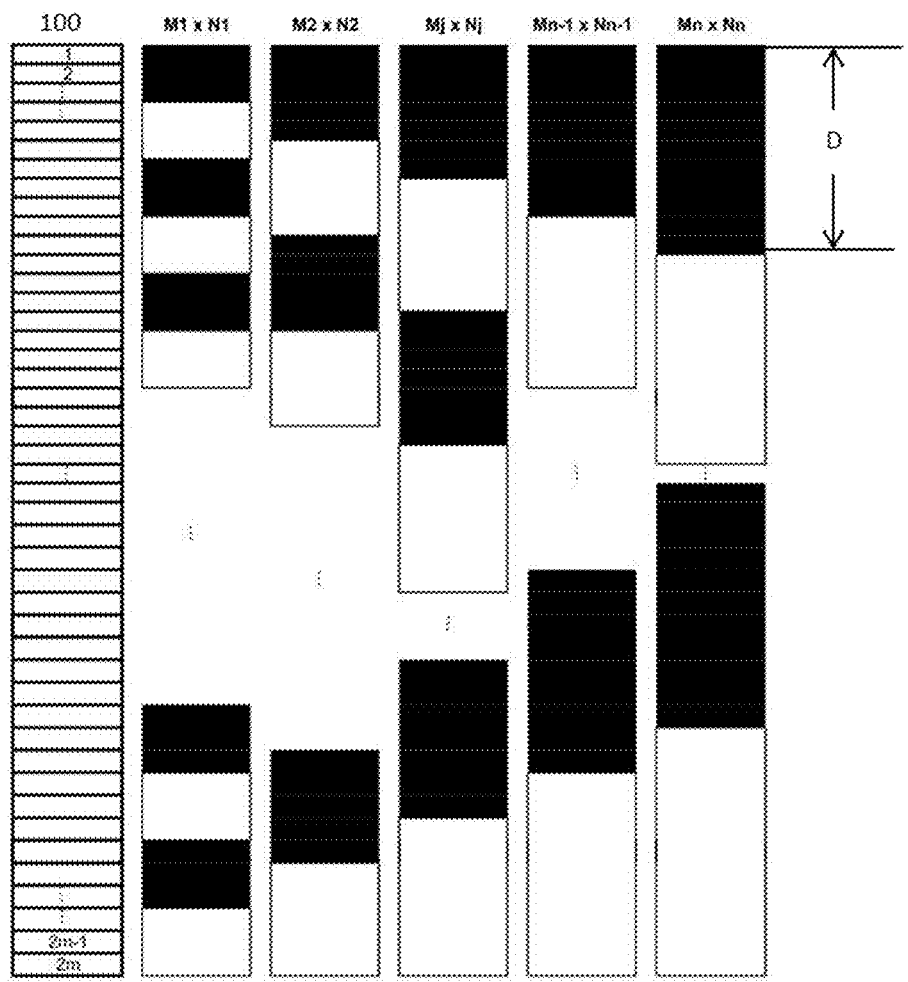
FIG. 4 shows a schematic view of a display effect of a grating according to an embodiment of the present disclosure.

Hereinafter, the connection manner of the driving signal line and the simplest grating will be described in detail according to a specific embodiment of the present disclosure:

After determining the display state of each grating unit at each resolution, the grating units having the same display state at any one of the resolutions are connected to the same driving signal line. Thereby, a plurality of grating units may be simultaneously controlled by one driving signal line, which simplifies the arrangement of the driving signal lines. According to a specific embodiment of the present disclosure, referring to FIG. 4, the connection of the driving signal line to the grating units may be implemented by following steps: firstly encoding a plurality of grating units from 1 to 2m in an order from top to bottom, and sequentially naming a plurality of driving signal lines from left to right by S0-SN. Secondly, the plurality of grating units are sequentially identified as corresponding codes "1", "0", each grating unit corresponds to a set of n-bit binary codes, and the i-th grating unit is electrically connected to the Sqth driving signal lines, in which "1" indicates that the grating unit is in one of the light blocking state and the light penetration state, and "0" indicates that the grating unit is in the other one of the light blocking state and the light penetration state. At each specific resolution of the multiple compatible resolutions, the i-th grating corresponds to one state, and the binary number of the i-th grating unit is composed of n binary digits arranged in sequence, n is the total number of the compatible multiple resolutions. And i is a natural number and i≤2m, q is a decimal number corresponding to the n-bit binary number which corresponds to the i-th grating unit and q≤N. It should be particularly noted that, in the present disclosure, "a decimal number corresponding to a binary number" means: a grating unit having the same n-bit binary number, corresponds to a decimal number, that is, corresponds to a driving signal line of the S0-SN driving signal lines. For example, the grating unit 1 has a set of n-bit binary digits corresponding to the driving signal line S0; the grating unit 2 has a set of n-bit binary digits different from that of the grating unit 1 and corresponding to the driving signal line S1, and so on. When the n-bit binary number of the grating unit i is the same as that of the n-bit binary number of the grating unit 1, the grating unit i also corresponds to the driving signal line S0. Thereby, it is possible to connect the grating unit having the same display state at each resolution to the same driving signal line, thereby the number of driving signal lines may be saved to the utmost.

In another aspect of the present disclosure, the present disclosure proposes a method for driving a grating. According to an embodiment of the present disclosure, the grating may be the grating described above, without repeating here. Therefore the grating may have the same features and advantages as the grating described above, and will not be described in detail here. According to an embodiment of the present disclosure, the grating may be applied to a plurality of naked eye three dimensional display system which have the same size, and have different resolutions. Thus, the grating may enable different display systems with the same size to be compatible with multiple resolutions, and may achieve a switch among multiple resolutions. The type of the grating and the setting position have been described in detail, and will not be described herein.

Figure 3:
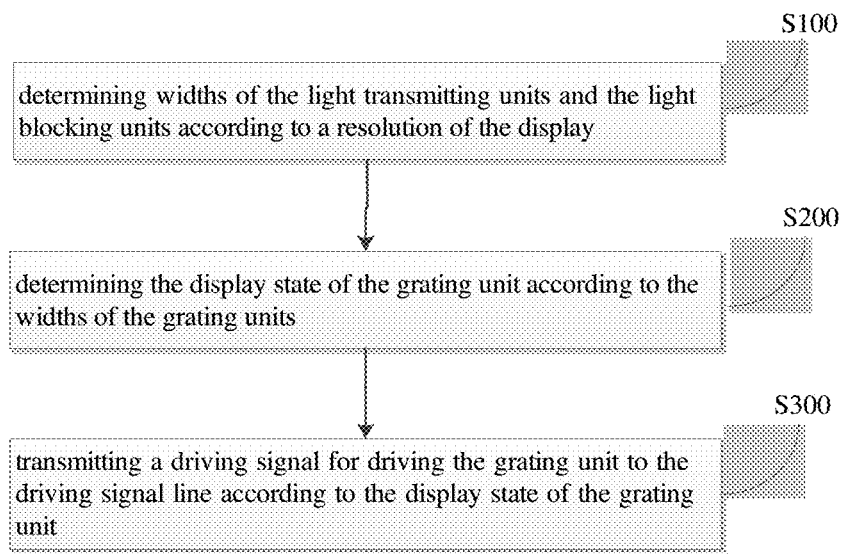
FIG. 3 shows a schematic view of a flow chart of a method for driving a grating according to an embodiment of the present disclosure.

According to an embodiment of the present disclosure, for driving the grating, it is required to connect the grating unit to the driving signal line and then to drive the grating units to present a light penetration state or a light blocking state by applying a voltage to the driving signal line. Specifically, the grating units having the same display state at any one of the resolutions are connected to the same driving signal line. The display state of the grating unit and the same display state may be determined according to the resolutions. According to a specific embodiment of the present disclosure, the display state of each grating unit at each resolution may be determined according to the grating constant (as D shown in FIG. 4) and the slit width of the simplest grating at each resolution, while the grating constant and the slit width of the simplest grating at each resolution may in turn be determined according to the resolution. That is to say, the widths of the light transmitting unit and the light blocking unit may be determined according to the grating constant. According to an embodiment of the present disclosure, after determining the display state of each grating unit at each resolution, the grating units having the same display state at any one of the resolutions are connected to one and the same driving signal line. Then according to the display state of the grating unit, a voltage is applied to the driving signal line connected to the grating unit to drive the grating unit. Specifically, referring to FIG. 3, the method for driving the grating includes:

S100: determining widths of the light transmitting units and the light blocking units according to a resolution of the display According to an embodiment of the present disclosure, in this step, the widths of the light transmitting units and the light blocking units are determined. According to an embodiment of the present disclosure, the grating constant and the slit width of the simplest gratings at each resolution may be determined according to the corresponding resolution, and the grating constant and the slit width of the simplest grating may be adjusted according to the resolution. That is to say, the grating constant and the slit width of the simplest gratings are different at different resolutions. According to a specific embodiment of the present disclosure, the grating constant D and the slit width may be determined by the following steps:

Firstly, assuming that the grating may be compatible with n resolutions, and the ratio of the total number of rows of various resolutions to the total number of columns of various resolutions is a fixed value. Subsequently, the grating constant D and the slit width of the jth resolution of the simplest grating are determined according to the jth resolution:

$$D=2p \cdot m/b_j$$

where D is the grating constant of the simplest grating compatible with the jth resolution, $b_j$ is the grating unit coefficient, and m is the least common multiple of $b_j$. The calculation of the grating unit coefficient $b_j$ and the least common multiple m of $b_j$ corresponding to the jth resolution has been described in detail above and will not be described repeatedly herein. Finally, the above steps are repeated to determine the grating constant and the slit width for each of the various resolutions. Those skilled in the art may understand that, when the grating unit width Wd is equal to the pitch of the periodic arrangement of the grating at a certain resolution among the above compatible multiple resolutions, the slit width is D/2. When the width of the grating unit is not equal to the pitch of the periodic arrangement of the grating, the slit width is comprehensively determined according to the pitch of the grating periodic arrangement and the number of grating units in the light blocking state. Thus, the grating constant and the slit width of the simplest grating at each resolution may be determined through the resolution.

According to an embodiment of the present disclosure, after the grating constant D is determined, the width of the light transmitting unit and the light blocking unit may be determined according to the grating constant, and the width thereof is D/2. Thereby, the widths of the light transmitting unit and the light blocking unit of the simplest grating may be determined.

S200: determining the display state of the grating unit according to the widths of the grating units According to an embodiment of the present disclosure, after the grating constant and the slit width of the simplest grating at each resolution are determined, a driven state of each grating unit may be determined based on the grating constant and the slit width. For example, according to an embodiment of the present disclosure, at the jth resolution, the grating constant of the grating unit is $D=2p \cdot m/b_j$, and when the width of the grating unit is equal to the pitch of the periodic arrangement of the grating, the slit width is $D/2=p \cdot m/b_j$, that is to say, the width of each of the light transmitting unit and the light blocking unit is $m/b_j$ times the width of the grating unit. Thereby, m/bj grating units arranged sequentially and adjacently are in a light penetration state, and adjacent thereto are $m/b_j$ grating units in a light blocking state which are sequentially and adjacently arranged. According to an embodiment of the present disclosure, when the first grating unit is in a light blocking state, the first grating unit to the $m/b_j$th grating units which are sequentially and adjacently arranged are all in the light blocking state, and $m/b_j$ grating units which are adjacent to the $m/b_j$th grating unit are all in the light penetration state, and so on. According to further embodiments of the present disclosure, when the first grating unit is in the light penetration state, the first grating unit to the $m/b_j$th grating unit which are sequentially and adjacently arranged are in a light penetration state, and $m/b_j$ grating units which are adjacent to the $m/B_j$th grating unit are in the light blocking state, and so on. Thereby, the display state of each grating unit at each resolution may be determined.

S300: transmitting a driving signal for driving the grating unit to the driving signal line according to the display state of the grating unit According to an embodiment of the present disclosure, after the grating unit is connected to the corresponding driving signal line, a voltage is applied to the grating unit to drive the grating unit to present a light penetration state or a light blocking state. According to an embodiment of the present disclosure, according to a display state of each of the grating units, a voltage is applied to a driving signal line connected thereto. For example, according to an embodiment of the present disclosure, when the grating unit is in the light blocking state, a first driving voltage is applied to a driving signal line connected to the grating unit to cause the grating unit to present a light blocking state. According to further embodiments of the present disclosure, when the grating unit is in the light penetration state, a second driving voltage is applied to the driving signal line connected to the grating unit to cause the grating unit to present a light penetration state. Thereby, the control of the display state of the grating unit may be realized with a simple method, so that a switching among multiple resolutions in the same size display screen may be realized.

In another aspect of the disclosure, the present disclosure provides a naked eye three dimensional display system. According to an embodiment of the present disclosure, the naked eye three dimensional display system includes a display screen and a grating. The grating is arranged to enable the display screen to achieve a naked eye three dimensional display. For example, in particular, the grating is a grating as described above, whereby the grating has all the features and advantages of the grating described above, which details are not described repeatedly herein. In general, the naked eye three dimensional display system has at least one of the advantages of low cost and the like due to using a grating capable of switching among a plurality of resolutions.

Regarding the type of the display screen, there is no particular limitation, and those skilled in the art may design them according to the specific situation. The arrangement position of the grating is also not particularly limited as long as a control to light may be realized. For example, according to an embodiment of the present disclosure, the display screen may be a liquid crystal display screen, and the grating may be disposed in front of the liquid crystal display screen or disposed behind the liquid crystal display screen. Specifically, when the grating is disposed in front of the liquid crystal display screen, since the liquid crystal display screen has a backlight source, the light emitted by the backlight source passes through the liquid crystal display screen, and then passes through the grating, and the light may be controlled by the grating, thereby achieving the light penetration state and the light blocking state of the grating, and thereby achieving switching among different resolutions. Similarly, when the grating is disposed behind the liquid crystal display screen, the grating is disposed between the backlight source and the liquid crystal, so that the light emitted by the backlight source may pass through the grating to realize a control to the light by the grating, thereby achieving a switching among different resolutions. According to further embodiments of the present disclosure, the display screen may also be an OLED display screen, and the grating may be disposed in front of the OLED display screen. Specifically, since the OLED display screen is a self-luminous device, which emits light through an organic material illuminating layer, and the grating is disposed in front of the OLED display screen, so that the light emitted by the organic material illuminating layer passes through the grating, thereby realizing a control to the light by the grating, and thereby achieving a switching among different resolutions.

A specific embodiment of the present disclosure is described in detail below.

The grating may be compatible with three resolutions, i.e. UHD (2160×3840), QHD (1440×2560), FHD (1080×1920), that is, n=3, where the highest resolution is $M_1 \times N_1$, i.e. 2160×3840. First, the ratio of the total number of rows to the total number of columns for each resolution is:

$$\frac{M_1}{N_1} = \frac{2160}{3840} = \frac{9}{16}, \frac{M_2}{N_2} = \frac{1440}{2560} = \frac{9}{16}, \frac{M_3}{N_3} = \frac{1080}{1920} = \frac{9}{16},$$

Therefore, the ratio of the total number of rows to the total number of columns of the three resolutions is a fixed value, which satisfies the condition for achieving switching among multiple resolutions. Subsequently, the total number and widths of the grating units required by the grating are calculated. The total number of grating units Z is calculated as follows:

Firstly, the greatest common divisor A1 of the total number of rows of the three resolutions A1=360 and the greatest common divisor A2 of the total number of columns A2=640 are calculated using the total number of rows of each resolution and the total number of columns. According to the formula (2) described above, the grating unit coefficients for each resolution may be calculated, $b_1=6$, $b_2=4$, $b_3=3$, from which the least common multiple of the grating unit coefficients for each resolution may be obtained m=12. Then, based on the above-described formula (3), the total number of grating units compatible with the above three kinds of resolutions is calculated to be Z=2m=24.

The width Wd of the grating unit is calculated as follows: assuming that the size d of the display screen is 5.5 inches, the placement height h of the grating is 0.4 mm, and the distance H between the observer's viewpoint and the display screen is 25 cm, the width of the grating unit may be calculated according to the formula described above. Specifically, firstly, according to the formula (4), the pixel pitch is calculated by using the size d and the highest resolution of the display screen to be P=31.7 µm, and secondly, r in the formula (5) is calculated, r is the maximum value in the grating unit coefficient for each resolution, i.e. $r=b_1=6$. When the grating is a rear grating or a post-grating, the adjustment coefficient of the visual range α may be calculated according to the formula (6) to be α=1.0016. Finally, the pitch of the periodic arrangement of the grating units is calculated according to the formula (5) to be p=15.875 µm. In the present embodiment, the width of the selected grating unit is selected to be equal to the pitch p, that is, the width of the grating unit is Wd=p=15.875 µm. Thus, the total number of grating units compatible with the above three resolutions is calculated to be 24 according to the formula, and the width of the grating unit is 15.875 µm.

Figure 5:
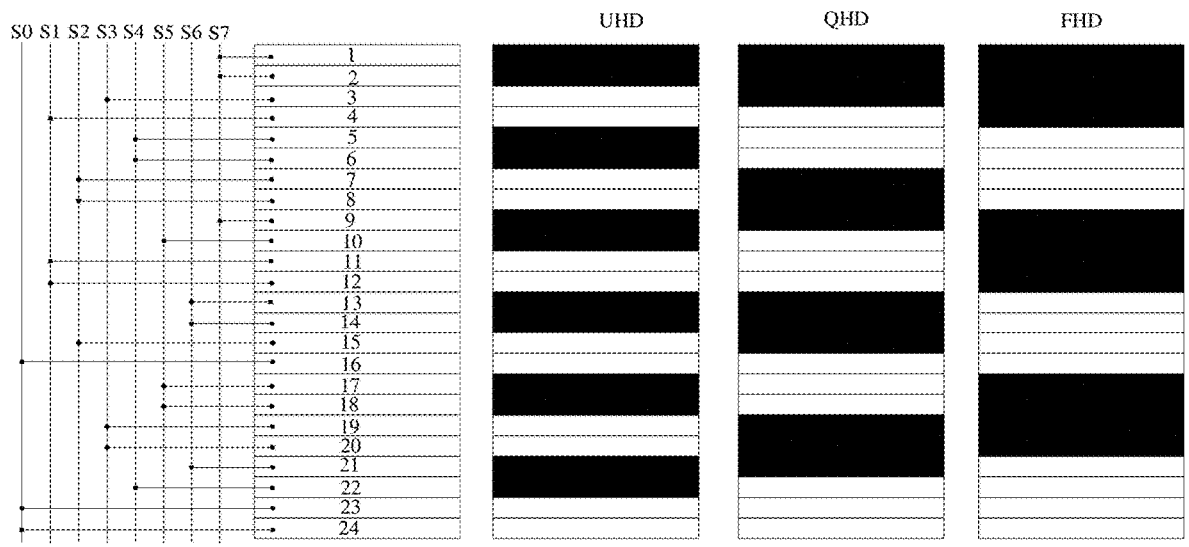
FIG. 5 shows a schematic view of electrical connections and display effects of a grating according to an embodiment of the present disclosure.

A grating capable of being compatible with the above three resolutions requires a total number of independent driving signal lines to be $N=2^n=8$. The manner in which the grating is connected to the driving signal line and the grating display effect are as shown in FIG. 5. It should be understood that the minimum period of a grating electrical connection unit is shown in FIG. 5. The connection of the grating with the driving signal line is determined by the following calculation:

Firstly, the grating constant D and the slit width of the grating at each resolution are determined according to the resolutions, $D=2p \cdot m/b_j$. As described above, when the width of the grating unit is equal to the pitch of the periodic arrangement of the grating, the width of the combined grating unit in the light blocking state is equal to the width of the combined grating unit in the light penetration state. That is to say, the slit width is D/2, and the width of the light transmitting unit or the light blocking unit is $m/b_j$ times the width of the grating unit. Therefore, it may be calculated that the width of the light transmitting unit or the light blocking unit at the first resolution is $m/b_1=2$ times the width of the grating unit, $m/b_2=3$ times the width of the grating unit at the second resolution, and $m/b_3=4$ times the width of the grating unit at the third resolution.

Secondly, the display state of each grating unit is determined according to the grating constant at each resolution. As shown in FIG. 5, when the first grating unit is in the light blocking state, in the case of the first resolution, the first to the second are both in the light blocking state, and the third to fourth are in the light blocking state, and so on; in the case of the second resolution, the first to the third are in the light blocking state, the fourth to the sixth are in the light penetration state, and so on; at the third resolution, the first to the fourth are in the light blocking state, and the fifth to the eighth are in the light penetration state, and so on.

Finally, the connection to the corresponding driving signal line is made according to the display state of the grating unit. As described above, if "1" indicates that the grating unit is in the light blocking state, "0" indicates that the grating unit is in a light penetration state. Thereby a set of binary codes which indicates the display states of each grating unit at three resolutions is obtained, and then its corresponding decimal number q is obtained according to the binary code of the grating unit, so that the grating unit is connected to the driving signal line coded as Sq. For example, the binary code of the first grating unit is {1, 1, 1}, and its corresponding decimal number q is 7, so the first grating unit is connected to S7. The binary code of the second grating unit is {1, 1, 1}, and its corresponding decimal number q is 7, so the second grating unit is also connected to S7. That is to say, the grating units having the same display state at any one of the resolutions are connected to the same driving signal line. The binary code of the third grating unit is {0, 1, 1}, and its corresponding decimal number q is 3. Therefore, the third grating unit is also connected to S3. By analogy, the codes of the driving signal lines corresponding to each of the grating units are respectively calculated, and the grating unit is connected to the corresponding driving signal lines.

After determining the driving signal line corresponding to each of the grating units, a voltage is applied to the signal lines to drive the grating unit to present a light penetration state or a light blocking state. Specifically, according to the display state of each of the grating units, a corresponding driving voltage is applied to the driving signal line connected thereto. As described above, the first driving voltage causes the grating unit to be in a light blocking state, and the second driving voltage causes the grating unit to be in a light penetration state. In the case of the first resolution, since the driving signal line S7 is connected to the first, the second, and the ninth grating units, and these three grating units are in a light blocking state, thereby a first driving voltage is applied to the driving signal line S7. Similarly, the driving signal line S1 is connected to the fourth, the eleventh and the twelfth grating units, and these three grating units are all in a light penetration state, thereby a second driving voltage is applied to the driving signal line S1. Thus, in the case of the first resolution, the driving signal lines S4, S5, S6, and S7 are connected to the first drive voltage, and the driving signal lines S0, S1, S2, and S3 are connected to the second drive voltage. In the case of the second resolution, the driving signal lines S2, S3, S6, and S7 are connected to the first drive voltage, and the driving signal lines S0, S1, S4, and S5 are connected to the second drive voltage. At the third resolution, the driving signal lines S1, S3, S5 and S7 are connected to the first drive voltage, and the driving signal lines S0, S2, S4 and S6 are connected to the second drive voltage.

In the description of the present specification, the terms "an embodiment", "another embodiment" or the like means that the specific features, structures, materials or characteristics described in connection with the embodiments are included in at least one embodiment of the present disclosure. In the present specification, the schematic representation of the above terms is not necessarily directed to the same embodiment or example. Furthermore, the specific features, structures, materials, or characteristics described may be incorporated in a suitable manner in any one or more embodiments or examples. In addition, various embodiments or examples described in the specification and features of various embodiments or examples may be assembled and combined without departing from the protective scope of the present disclosure.

While the embodiments of the present disclosure have been shown and described above, it is understood that the foregoing embodiments are illustrative and are not to be construed as limiting the present disclosure. Those skilled in the prior art may make variations, modifications and substitutions without departing from protective scope of the disclosure.

What is claimed is:

1. A grating comprising a simplest grating and driving signal lines, the simplest grating is composed of a plurality of grating units arranged in sequence, wherein the driving signal lines are connected to the grating units, and the driving signal line is configured to transmit a driving signal to each one of the plurality of grating units according to different resolutions so as to drive each grating unit to present a light penetration state or a light blocking state such that a grating constant corresponding to the resolution is obtained by the simplest grating, wherein each of the grating units has a plurality of grating unit coefficients bj, the number of the grating unit coefficients being equal to the number of the resolutions; the number Z of grating units in the simplest grating satisfies Z=2m, where m is the least common multiple of the plurality of grating unit coefficients bj, the grating unit coefficients bj being:

$b_j = M_j/A1 = N_j/A2$ where Mj×Nj is the jth resolution of the plurality of resolutions, j, Mj, Nj are natural numbers and j≤n, where n is the total number of the plurality of resolutions, and Mj and Nj represent the total number of rows of pixels in the jth resolution and the total number of columns of pixels in the jth resolution, and Mj/Nj is a fixed value, A1 is the greatest common divisor of the total number of rows of the plurality of resolutions, and A2 is the greatest common divisor of the total number of columns of the plurality of resolutions.

2. The grating according to claim 1, wherein, according to different resolutions, the simplest grating is driven to form light transmitting units and light blocking units which are alternately arranged, width of the light transmitting units and the light blocking units vary depending on the driving signal, wherein the light transmitting units are respectively formed by combining grating units in the light penetration state, and the light blocking units are respectively formed by combining grating units in the light blocking state.

3. The grating according to claim 1, wherein a ratio of a width Wd of the grating unit to a pitch p of periodically arranged grating units is (1:0.6)(1:1.5), the pitch p satisfies $p = \alpha \cdot P \cdot r/m$, where α is an adjustment coefficient of a visual range, r is a maximum value of the plurality of grating unit coefficients $b_j$, a pixel pitch P satisfies: $P = \sqrt{d^2/(M_1^2 + N_1^2)}$, where d is the size of a display screen of the naked eye three-dimensional display system, and $M_1 \times N_1$ is the highest resolution among the plurality of resolutions.

4. The grating according to claim 1, wherein the number of the driving signal lines is N, and $N = 2^n$, where n is the total number of the plurality of resolutions.

5. The grating according to claim 4, wherein each of the grating units of the simplest grating is assigned a code, the number of bits of the code being the number of the resolutions and those grating units with the same code being connected to a same driving signal line;

wherein, for each resolution, the grating unit is encoded as one of 0 and 1 corresponding to the resolution in a condition that the grating unit is driven to present a light penetration state; the grating unit is encoded as the other one of 0 and 1 in a condition that the grating unit is driven to present a light-blocking state.

6. The grating according to claim 5, wherein, among the plurality of the grating units, those grating units having a same display state at any resolutions are connected to the same driving signal line.

7. A grating according to claim 1, wherein the grating is a liquid crystal grating or an electrochromic grating.

8. A method for driving a grating, wherein the grating comprises a simplest grating and driving signal lines, the simplest grating is composed of a plurality of grating units arranged in sequence, the driving signal lines being connected to the grated units and each of the driving signal line is configured to transmit a driving signal to a respective one of the plurality of grating units according to different resolutions so as to drive each grating unit to present a light penetration state or a light blocking state, the method comprising:

(1) determining a display state of the grating unit according to a resolution of the display;

(2) transmitting a driving signal for driving the grating unit to the driving signal line according to the display state, wherein a grating constant D of the simplest grating satisfies $D = 2p \cdot m/b_j$, where $b_j$ is a grating unit coefficient, and the grating unit coefficient $b_j$ is: $b_j = M_j/A1 = N_j/A2$, where $M_j/N_j$ is the jth resolution of the plurality of resolutions, j, $M_j$, $N_j$ are natural numbers and j≤n, where n is the total number of the plurality of resolutions, and $M_j$ and $N_j$ represent the total number of rows of pixels in the jth resolution and the total number of columns of pixels in the jth resolution, and $M_j/N_j$ is a fixed value, A1 is the greatest common divisor of the total number of rows of the plurality of resolutions, and A2 is the greatest common divisor of the total number of columns of the plurality of resolutions, m is the least common multiple of the plurality of grating unit coefficients, and p is a pitch of periodically arranged grating units which satisfies $p = \alpha \cdot P \cdot r/m$, wherein α is an adjustment coefficient of a visual range, r is a maximum value of the plurality of grating unit coefficients $b_j$, P is a pixel pitch and satisfies: $P = \sqrt{d^2/(M_1^2 + N_1^2)}$, where d is the size of a display screen of a naked eye three-dimensional display system, and $M_1 \times N_1$ is the highest resolution among the plurality of resolutions.

9. The method according to claim 8, wherein according to different resolutions, the simplest grating is driven to form light transmitting units and light blocking units which are alternately arranged, widths of the light transmitting units and the light blocking units vary depending on the driving signal, wherein the light transmitting units are respectively formed by combining grating units in the light penetration state, and the light blocking units are respectively formed by combining grating units in the light blocking state, wherein the step of determining a display state of the grating unit according to a resolution of the display comprises:

(1) determining widths of the light transmitting units and the light blocking units according to a resolution of the display;

(2) determining the display state of the grating unit according to the widths of the grating units.

10. The method according to claim 9, wherein the widths of the light transmitting units and the light blocking units are determined according to the grating constant D of the simplest grating, and the grating constant D are different depending on the resolutions, the widths of the light transmitting unit and the light blocking unit are equal and D/2.

11. A naked eye three-dimensional display system comprising:
a display screen; and
the grating according to claim 1.

12. The naked eye three-dimensional display system according to claim 11, wherein the display screen comprises a liquid crystal display screen, the grating being disposed in front of the liquid crystal display screen or behind the liquid crystal display screen,
or the display screen comprises an OLED display screen, the grating being arranged in front of the OLED display screen.

13. A method for manufacturing a grating, wherein the grating comprises a simplest grating and a driving signal line, the simplest grating is composed of a plurality of grating units arranged in sequence, the driving signal lines being connected to the grating units and each of the driving signal line is configured to transmit a driving signal to a respective one of the plurality of grating units according to different resolutions so as to drive each grating unit to present a light penetration state or a light blocking state, the method comprising:

(1) determining the number of the grating units and the width of the grating units according to the resolution of the display;

(2) determining the number of the driving signal lines, and connecting the driving signal lines to the corresponding grating units so that the grating units may be driven to form light transmitting units and light blocking units which are alternately arranged, wherein the number of the grating units is determined by the following steps:

determining a grating unit coefficient $b_j$ corresponding to each of the plurality of the resolutions:

$$b_j = M_j/A1 = N_j/A2$$

where $M_j \times N_j$ is the jth resolution of the plurality of resolutions, j, $M_j$, $N_j$ are natural numbers and $j \leq n$, where n is the total number of the plurality of resolutions, and $M_j$ and $N_j$ represent the total number of rows of pixels in the jth resolution and the total number of columns of pixels in the jth resolution, and $M_j/N_j$ is a fixed value, A1 is the greatest common divisor of the total number of rows of the plurality of resolutions, and A2 is the greatest common divisor of the total number of columns of the plurality of resolutions, the number Z of grating units satisfies Z=2m, where m is the least common multiple of the plurality of grating unit coefficients;

the width of the grating units is determined by the following steps: a ratio of a width Wd of the grating unit to a pitch p of periodically arranged grating units is (1:0.6)~(1:1.5), the pitch p satisfies $p = \alpha \cdot P \cdot r/m$, where $\alpha$ is an adjustment coefficient of a visual range, r is a maximum value of the plurality of grating unit coefficients and P is a pixel pitch and satisfies: $P = \sqrt{d^2/(M_1^2 + N_1^2)}$, where d is the size of a display screen of the naked eye three-dimensional display system, and $M_1 \times N_1$ is the highest resolution among the plurality of resolutions.

14. The method according to claim 13, wherein, according to different resolutions, the simplest grating is driven to form light transmitting units and light blocking units which are alternately arranged, widths of the light transmitting units and the light blocking units vary depending on the driving signal, wherein the light transmitting units are respectively formed by combining grating units in the light penetration state, and the light blocking units are respectively formed by combining grating units in the light blocking state.

15. The method according to claim 14, wherein the number of the driving signal lines is $N = 2^n$, and n is the total number of the plurality of resolutions.

* * * * *